UNITED STATES PATENT OFFICE.

WILLIAM PUGH, OF BROOKLYN, NEW YORK.

PROCESS OF AND COMPOUND FOR WATERPROOFING AND PRESERVING GOODS.

SPECIFICATION forming part of Letters Patent No. 250,754, dated December 13, 1881.

Application filed October 24, 1881. (No specimens.)

*To all whom it may concern:*

Be it known that I, WILLIAM PUGH, of Brooklyn, Kings county, State of New York, have invented an Improvement in Processes of and Compounds for Waterproofing and Preserving Goods, of which the following description is a specification.

The object of my improvement is to render mildew and moth proof and water-proof all kinds of textile and vegetable fibers and fabrics, such as felt and felted manufactures, cotton, linen, or hempen cordage, and twine, paper, &c.

This improvement is especially useful for waterproofing fire-hose and protecting it against mildew, whether made of cotton, linen, or leather, and also for preserving woolen and other goods of all kinds, it rendering them moth and water-proof.

In subjecting materials to my new and improved process they are treated in three distinct and separate baths, the first of which I prepare as follows: I take one (1) part of resin and one-third ($\frac{1}{3}$) part of caustic soda, and one-eighth ($\frac{1}{8}$) part of castor-oil, and I dissolve them together in one hundred and twenty-eight (128) parts of water by means of heat. When thoroughly dissolved and of uniform consistency I add to this solution a sufficient amount of salicylic acid or its equivalent, (instead of the salicylic acid acetate of alumina may sometimes be used advantageously,) stirring it well in order to make the combination perfect, when the first bath is ready for use. The goods to be rendered mildew, moth, and water proof are placed in this first bath and allowed to remain four hours, more or less, according to their weight and quality. The goods are then to be taken from this bath and wrung out or well drained, when they are ready to be treated in the second bath, which is prepared as follows: I take four parts of sulphate of copper, six parts of sulphate of zinc, six parts of potash-alum (aluminum potassium sulphate,) and one twenty-fourth ($\frac{1}{24}$) part of carbonate of soda or equivalent alkali, and I dissolve them in thirty-two parts of boiling water. I then take nine parts of acetate of lead and dissolve in thirty-two parts of boiling water. When both compounds are dissolved I enter the latter into the former and mix them well together, after which the mixture is allowed to stand a sufficient time for the precipitate to settle. Sulphate of alumina may be used instead of the potash-alum. When this compound has become perfectly clear it is drawn or siphoned off from the precipitate into a suitable vessel. I then, preferably, take one-half ($\frac{1}{2}$) part of chloride of sodium and dissolve it in four parts of boiling water, and add it to the said clear compound, making the "second bath" ready for use. The goods which have been treated in the "first bath," as above stated, are now placed in this second bath and allowed to remain for half an hour, more or less, depending, as before, on their weight and quality, after which they are removed and wrung out or well drained.

The "third bath" is simply water, in which the articles treated as described are well washed, and then removed and wrung out or drained and dried.

In the second bath the ingredients may be somewhat varied, but the compound given produces the best results. For instance, the carbonate of soda may be omitted, in which case a larger amount of acetate of lead should be used, and the sulphate of copper might be replaced by an additional amount of potash-alum.

The solution of chloride of sodium might be omitted, but its use improves the quality of the goods treated, and renders them less liable to be injured by heat.

I claim—

1. The herein-described bath, consisting of resin, castor-oil, caustic soda, and salicylic acid, or equivalent, for the purpose of rendering material mildew-proof, substantially as described.

2. The herein-described bath, containing the following ingredients: sulphates of copper and zinc, carbonate of soda, or equivalent, and acetate of lead, in substantially the proportions described, for treating material in the process of waterproofing, substantially as set forth.

3. In a bath for treating material in the process of waterproofing, sulphate of zinc, potash-alum, or equivalent, carbonate of soda, or equivalent, and acetate of lead, compounded substantially as and in the proportions described.

4. The herein-described bath, consisting of sulphates of copper and zinc, potash-alum, carbonate of soda, acetate of lead, and sodium chloride, substantially as set forth.

In testimony whereof I have signed my name to this specification in the presence of two subscribing witnesses.

WILLIAM PUGH.

Witnesses:
   JOS. P. LIVERMORE,
   B. J. NOYES.